US006779267B1

(12) United States Patent
Meier et al.

(10) Patent No.: US 6,779,267 B1
(45) Date of Patent: Aug. 24, 2004

(54) METHOD FOR INCREASING THE WEAR-RESISTANCE OF A WORK PIECE

(75) Inventors: Gerd Meier, Leinburg (DE); Carsten Rubner, Lauf (DE); Klaus Rubner, Lauf (DE); Peter Stingl, Lauf (DE); Helmut Radke, Nuremberg (DE); Steffen Tempel, Jessen (DE); Dietmar Leuteritz, Winkwitz (DE)

(73) Assignees: GeramTec AG Innovative Ceramic Engineering, Plochingen (DE); UKM Umformtechnik und Kraftfahrzeugkomponenten Meißen GmbH, Meißen (DE)

( * ) Notice: Subject to any disclaimer, the term of this patent is extended or adjusted under 35 U.S.C. 154(b) by 0 days.

(21) Appl. No.: 09/529,383

(22) PCT Filed: Oct. 13, 1998

(86) PCT No.: PCT/EP98/06479

§ 371 (c)(1),
(2), (4) Date: Aug. 10, 2000

(87) PCT Pub. No.: WO99/19271

PCT Pub. Date: Apr. 22, 1999

(30) Foreign Application Priority Data

Oct. 13, 1997 (DE) .......................................... 197 45 205
Feb. 19, 1998 (DE) .......................................... 198 06 888

(51) Int. Cl.[7] ................................................. B23P 17/00
(52) U.S. Cl. ................................ 29/888.452; 29/888.46
(58) Field of Search ................................ 428/467, 472; 29/509, 505, 522.1, 888.4, 888.43, 888.452, 888.451, 888.46, 888.45; 123/188.1, 188.8, 188.11

(56) References Cited

U.S. PATENT DOCUMENTS

| 4,829,950 A | * | 5/1989 | Kanamaru et al. ....... 29/888.03 |
| 4,924,825 A | * | 5/1990 | Speil ....................... 123/90.55 |
| 5,076,866 A | * | 12/1991 | Koike et al. ........... 29/888.452 |
| 5,724,860 A | * | 3/1998 | Sekiguchi et al. ......... 29/888.1 |
| 5,860,401 A | * | 1/1999 | Adachi et al. ........... 123/188.8 |

* cited by examiner

Primary Examiner—Charles T. Jordan
Assistant Examiner—T. Nguyen
(74) Attorney, Agent, or Firm—Antonelli, Terry, Stout & Kraus, LLP

(57) ABSTRACT

A method for increasing the wear-resistance of a work piece involves connecting the work piece to a non-formable core material having a greater hardness than that of the work piece material. In order to improve the connection while simultaneously reducing the costs, the core material is connected in a form-fitting manner to the work piece by means of cold extrusion or hot extrusion of the work piece material.

7 Claims, 5 Drawing Sheets

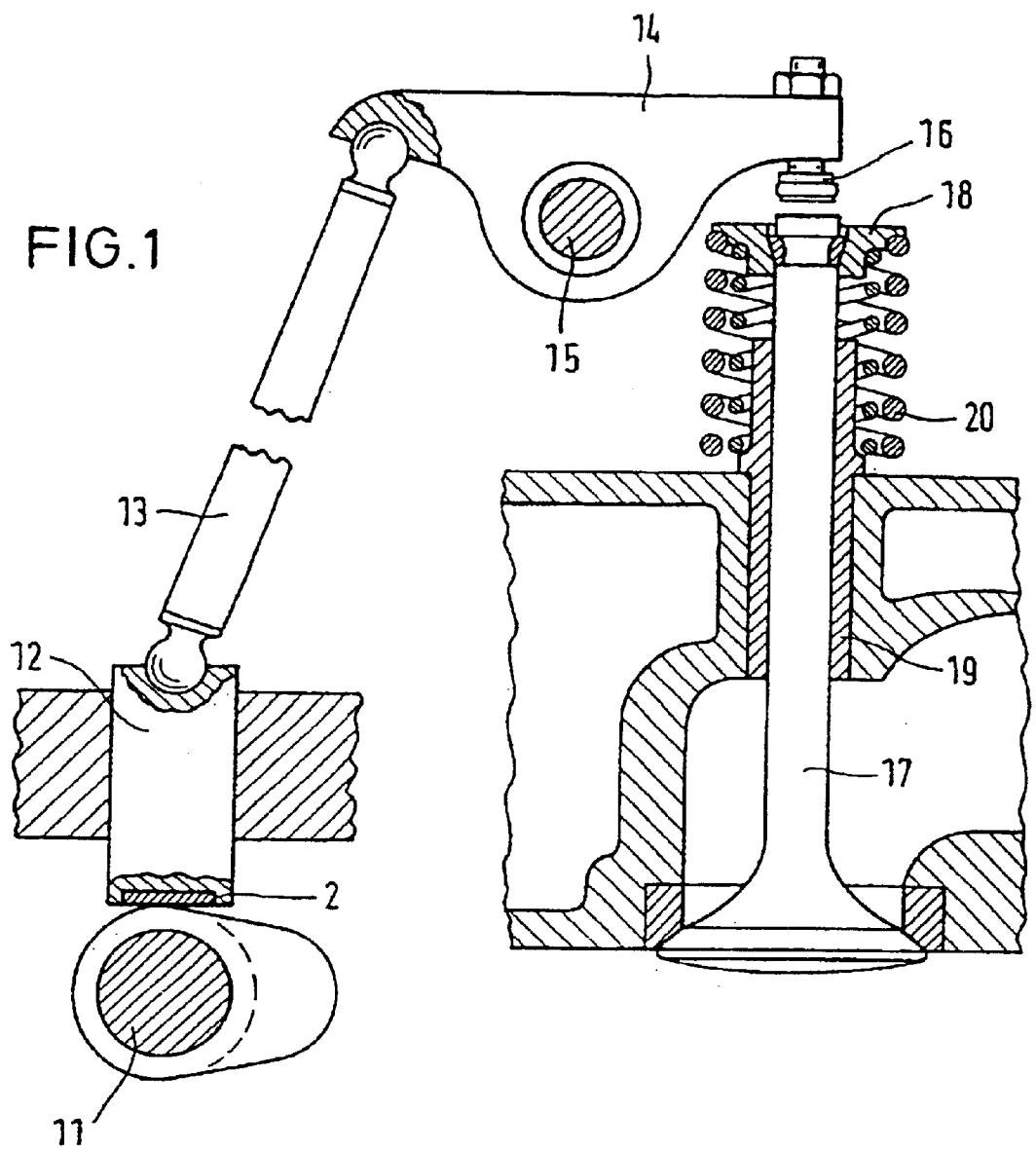
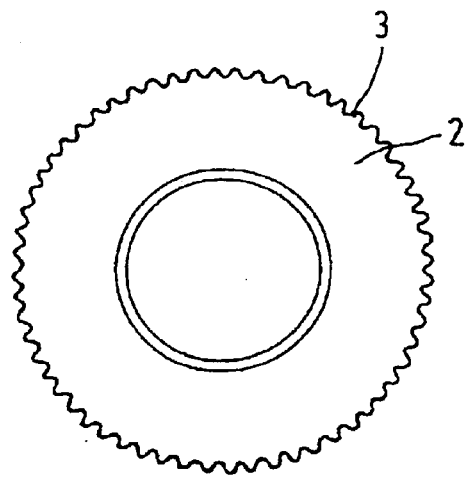
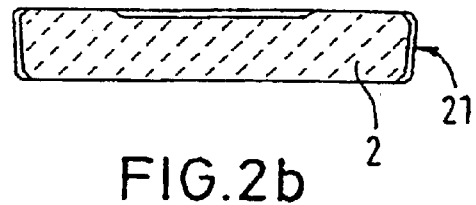
FIG.1
FIG.2a
FIG.2b

METHOD FOR INCREASING THE WEAR-RESISTANCE OF A WORK PIECE

BACKGROUND OF THE INVENTION

The invention relates to a method for increasing the wear resistance of a work piece in accordance with the preamble of claim 1.

In order to increase the wear resistance of a work piece it is known that the loaded surface of the work piece can be protected by means of a material that is of a greater hardness than the work-piece material. Materials that cannot be reshaped, such as hard metal or ceramic materials, called core materials in the following, are particularly suitable for this.

Connections between ceramic materials or hard metals and a metal or non-ferrous metal respectively as the work piece are produced at present by using the basic joining techniques, form-fitting, force-fitting and substance-fitting.

Moreover, connections which cannot be undone are currently mainly realized by means of soldering, welding and shrinkage methods and various bending-reshaping methods, for example flanging or rotatory reshaping under compressive conditions.

It is largely the soldering methods (for example high-temperature or active soldering) and also the welding methods that come into consideration for connections that undergo maximum mechanical stresses.

The disadvantages of the soldering and welding methods are the high costs of production as well as, in most cases, the need to use additional and/or intermediate substances that are matched to the expansion behaviour or the need to carry out structural measures to compensate for the different coefficients of thermal expansion in order to reduce stresses.

SUMMARY OF THE INVENTION

The underlying object of the invention is to improve a method for increasing the wear resistance of a work piece in accordance with the preamble of claim 1 in such a way that an extremely durable connection of the core material to the work piece is achieved with simple means and in a less expensive manner. In so doing, the dimensions of the work piece are to be maintained.

In accordance with the invention this object is achieved by connecting the core material to the work piece in a form-fitting manner by means of cold-extrusion or hot-extrusion of the work-piece material.

The method in accordance with the invention is a reshaping method in which a plastic change in the shape of a solid body is effected by means of compression or compression-drawing. The properties of the material and the dimensions of the body are thereby maintained. Cold-extrusion is extrusion without an additional supply of heat to the components or tools before or during the reshaping. However, heat can/will develop as a result of the reshaping. In the case of hot-extrusion, heat is supplied during the extrusion.

The new underlying idea of the method is to use the plastic change in the work-piece material, advantageously steel or non-ferrous metal, during the extrusion, and the non-reshapability of the ceramic sintered materials that have high grain-boundary stability based on dense, high-melting metal oxides, metal carbides and metal nitrides or hard metals and hardened metals, in order to produce a connection which cannot be undone. The sintered materials, the hard metal or the hardened metal of the core materials are shaped in terms of extrusion techniques in such a way that the plastic deformation of the metal/non-ferrous metal is not hindered, but rather is promoted, and the sintered materials or the hard metal are not overloaded with regard to their material properties, specifically the stability properties. Outer and inner contours of the work pieces are then determined by the producibility of the tools.

The connection is clearly less expensive as a result of the use of this new technology (savings in terms of time and materials).

Oxide ceramic materials, such as, for example, aluminium oxide, zirconium oxide, magnesium oxide, mixtures of aluminium oxide and zirconium oxide, silicon nitride, such as, for example, sintered silicon nitride (SSN), hot-pressed (HPSN) or gas pressure-sintered (GPSN) silicon nitride, silicon carbide, such as, for example, densely sintered silicon carbide (SSiC), silicon-infiltrated silicon carbide (SiSiC), dispersion ceramic materials, ceramic silicate materials and also mixtures of titanium carbide and aluminium oxide number among the ceramic sintered materials that are particularly suitable for the present invention. Numbering among these materials within the scope of the present invention are also those materials which contain, in small admixed quantities, magnesium oxide, calcium oxide and yttrium oxide and other sintering aids which are usually added, for example, as grain-growth inhibitors.

In the case of this invention all the hard metals which have mechanical strength values of $\sigma_B > 350$ N/mm$^2$ number among the hard metals which are particularly suitable.

All the metals of the material group 1.2379, for example, number among the hardenable metals which are particularly suitable.

In order to achieve security against torsion or a comparatively high degree of strength of the connection, suitable additional shaped elements such as, for example, rounded-off notches and/or areas or hollow spaces and/or undercuts are worked into the core materials or special surface qualities are produced.

In a particularly advantageous embodiment, the additional shaped elements are constituted by a knurling that is provided on the outside. Advantageously, moreover, the core material tapers towards the outside of the work piece. As a result, even better anchorage of the core material in the work piece is achieved.

In accordance with the invention advantageously an extrusion sleeve liner with a bore, in which a displaceable punch connects the work piece to the core material by means of cold-extrusion or hot-extrusion, is used as the pressing tool. In this connection, the core material is pressed into the work piece, or vice versa the work piece is pressed into the core material, is until the work-piece material is free-flowing under the pressure and flows around the core material. Promoted by the cold-work hardening of the work-piece material that occurs during the reshaping, a permanent, extremely firm connection of the core material with the work piece develops.

Advantageously, a displaceable ejector is provided as an abutment for the work piece or the core material in the bore in the sleeve liner. This ejector is used, after the extrusion, to eject, for example press, the finished work piece out of the sleeve liner.

In a special advantageous embodiment a constriction can also be provided as an abutment for the work piece in the bore in the sleeve liner. It is possible to push the work piece out of the sleeve liner after the extrusion by means of the ejector further described above.

Depending on the required application, it is also advantageous to form the punch as a hollow punch. In this case, the pressure is only applied to an annular outer region of the hollow punch. It is also expedient in specific cases if the punch, at its end that faces the work piece or core material, has a clearance from the bore in the sleeve liner.

In a special embodiment a further displaceable punch, to which force can be applied, is arranged in the punch. By means of this further punch it is possible to control the reshaping of the work-piece material in a purposeful manner.

Advantageously, this method is used in the case of work pieces of valve systems, in particular valve drives of internal combustion engines. Numbering amongst these there is, for example, a tappet that is driven by the cam shaft or else the setting screw of the rocker arm.

BRIEF DESCRIPTION OF THE DRAWINGS

Further features of the invention emerge from the figures which are described in the following and in which:

FIG. 1 shows the valve drive of an internal combustion engine with advantageous examples of application of the invention;

FIGS. 2a, b show a plan view (FIG. 2a) of and a section (FIG. 2b) through a core material, for example as an insert for a tappet;

BRIEF DESCRIPTION OF THE PREFERRED EMBODIMENTS

Figure 3:
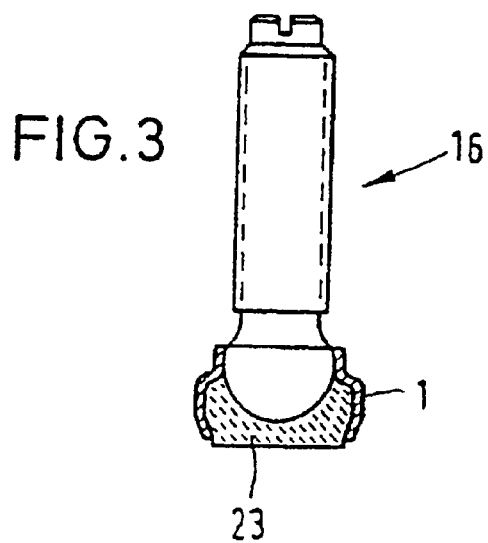
FIG. 3 shows a setting screw of a valve drive of an internal combustion engine.
Figure 4:
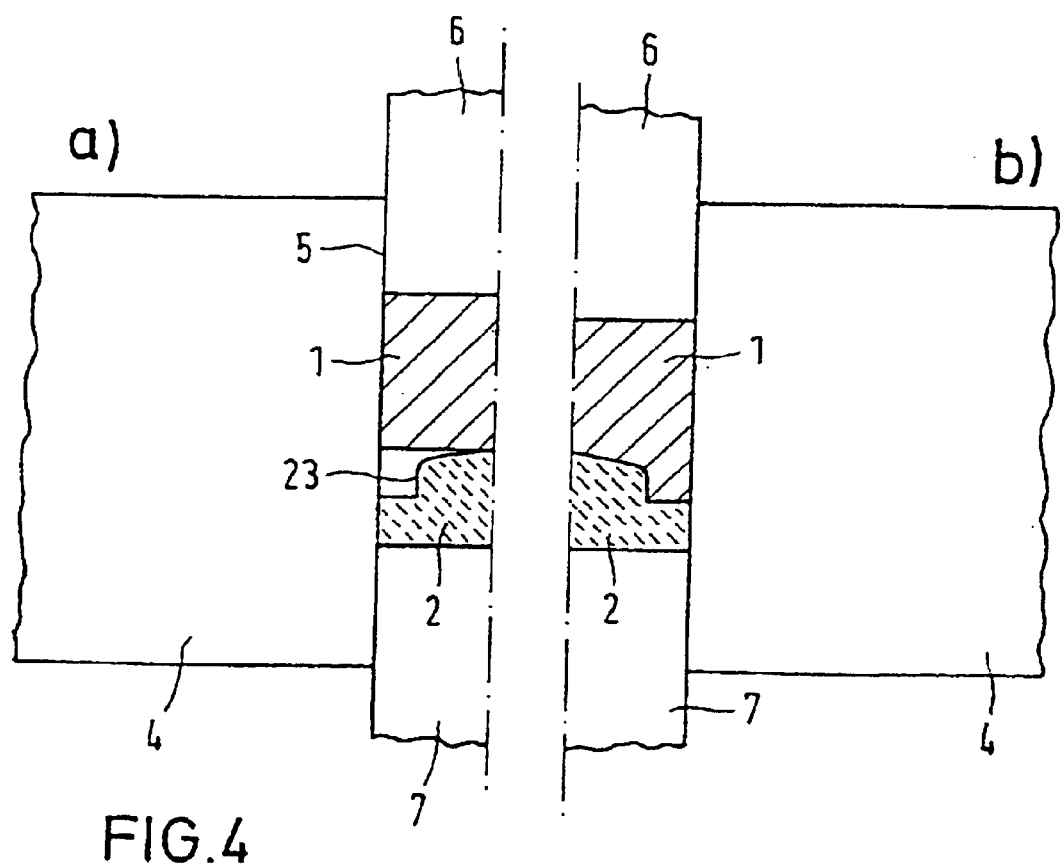
FIGS. 4a, b diagrammatically show forward cup extrusion.
Figure 5:
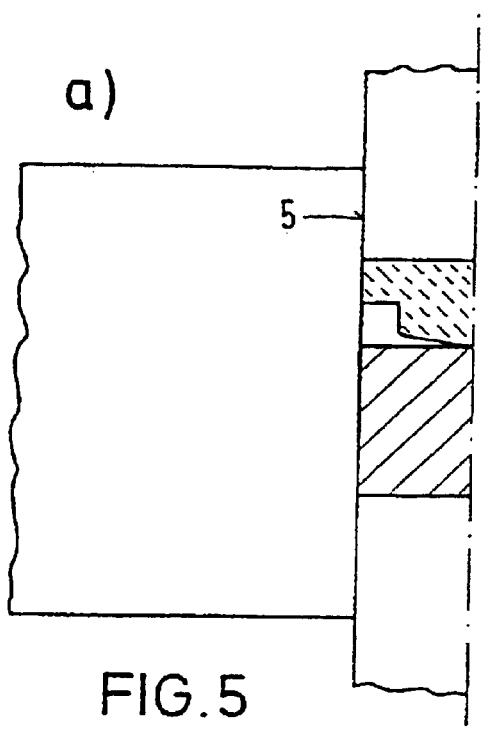
FIGS. 5a, b diagrammatically show backward cup extrusion.
Figure 5:
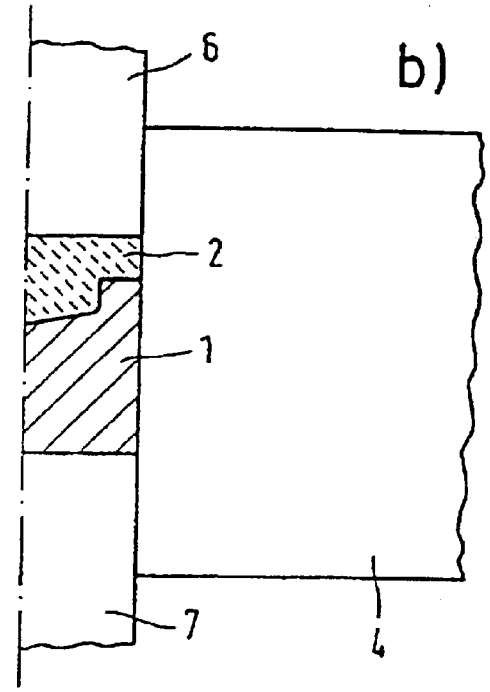
Figure 6:
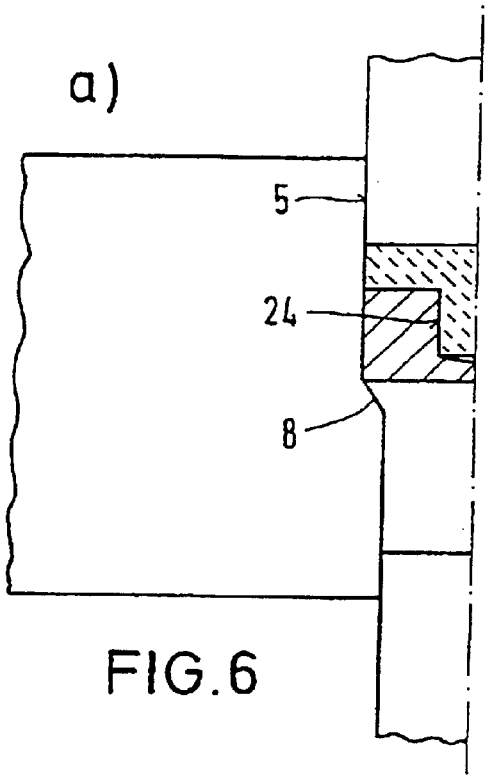
FIGS. 6a, b diagrammatically show forward tube extrusion.
Figure 6:
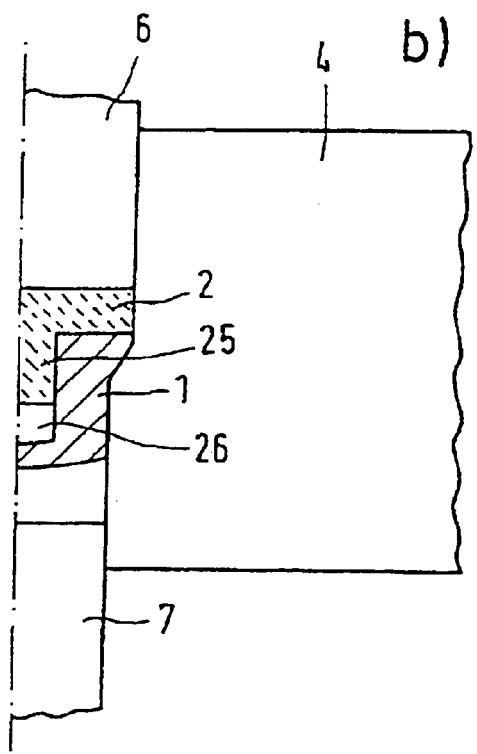
Figure 7:
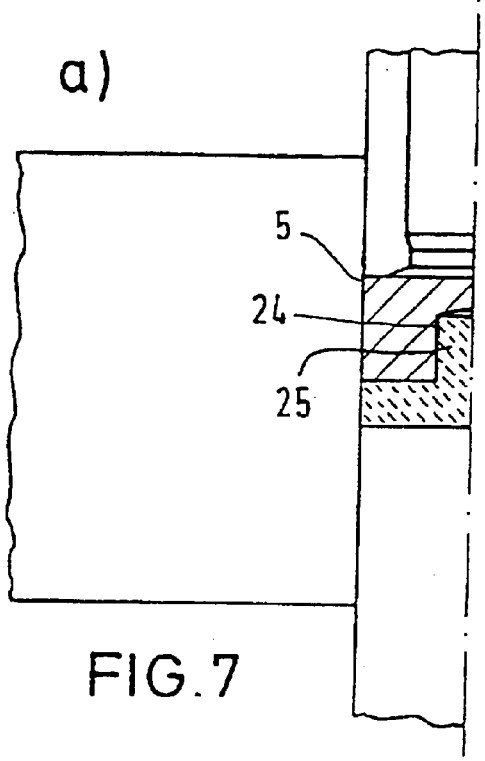
FIGS. 7a, b diagrammatically show backward tube extrusion.
Figure 7:
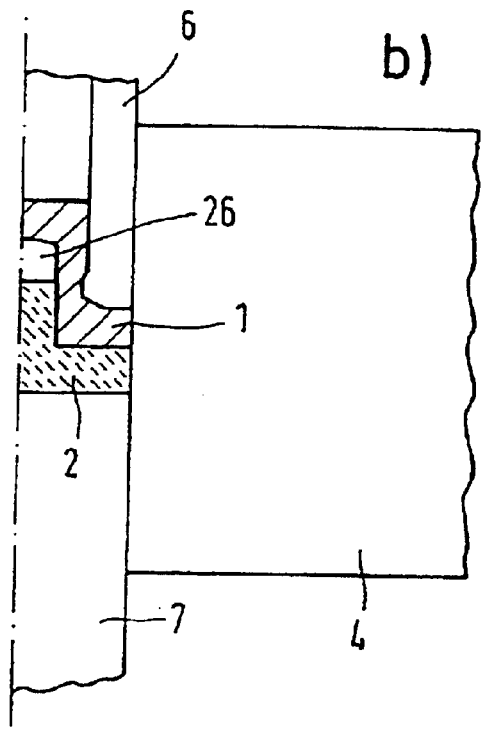
Figure 8:
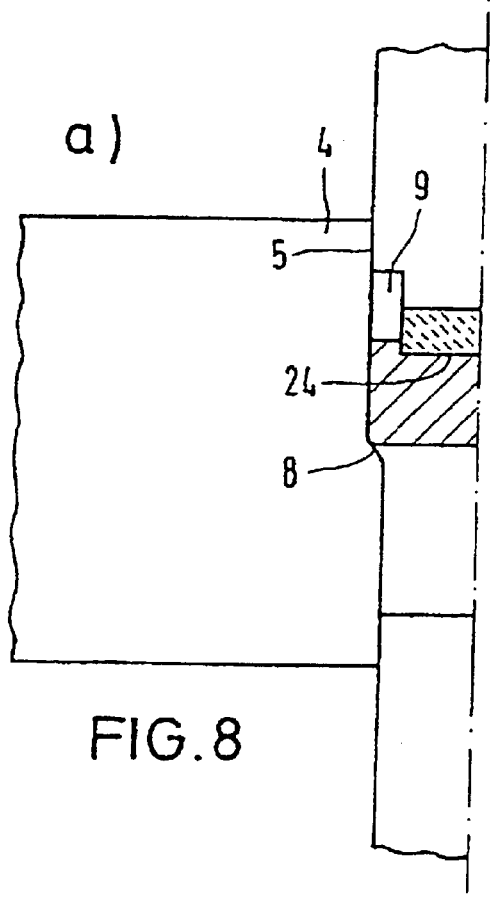
FIGS. 8a, b diagrammatically show forward solid extrusion or reduction.
Figure 8:
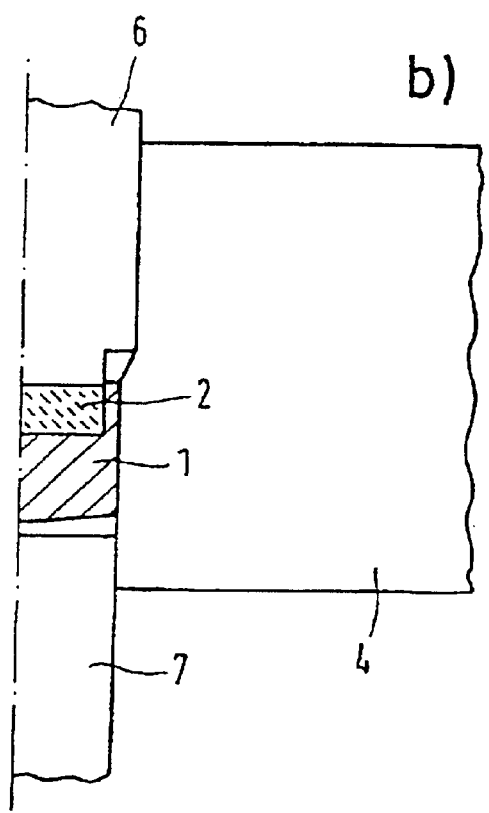
Figure 9:
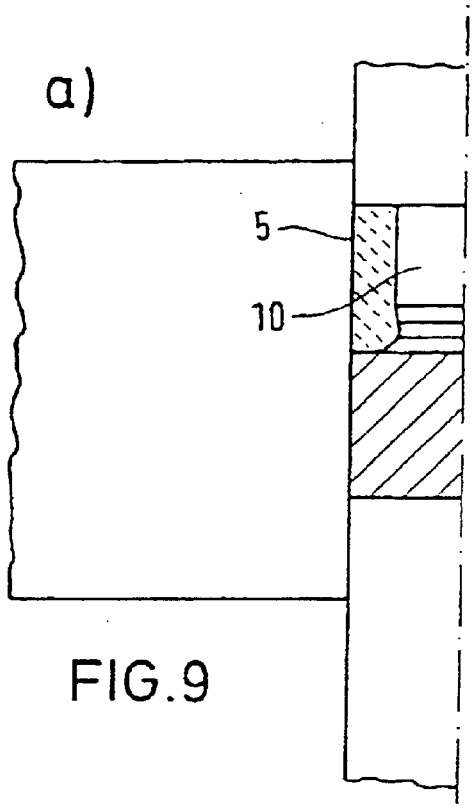
FIGS. 9a, b diagrammatically show backward solid extrusion.
Figure 9:
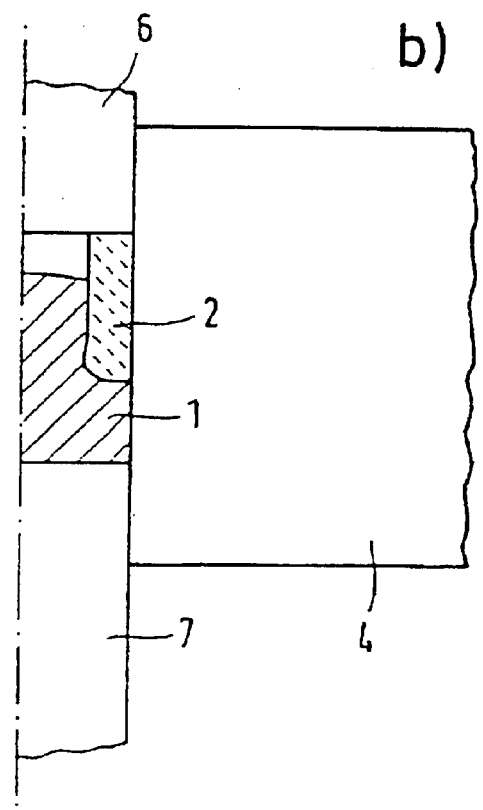
Figure 10:
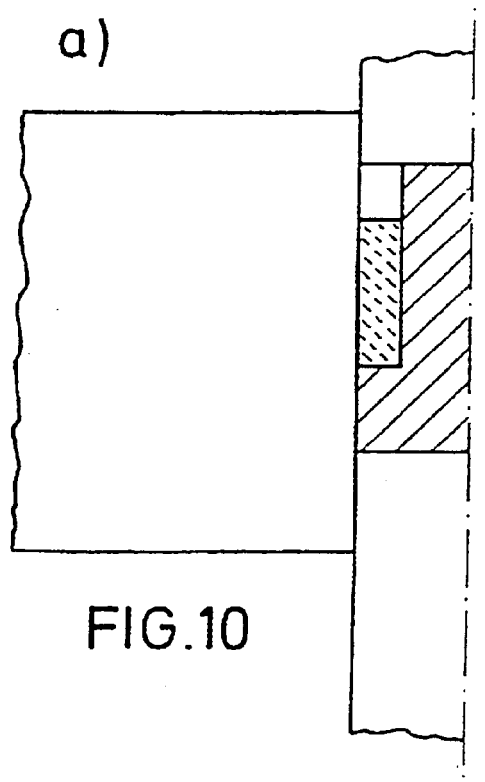
FIGS. 10a, b diagrammatically show lateral extrusion or compression.
Figure 10:
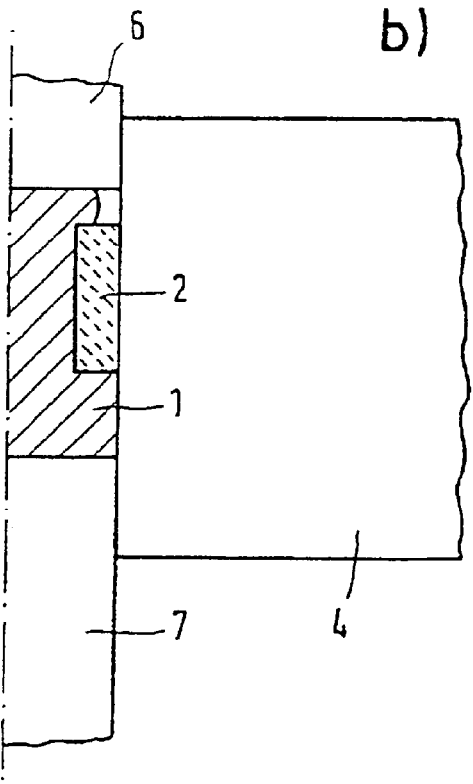

The valve drive of an internal combustion engine is diagrammatically shown in FIG. 1. It substantially consists of a cam shaft 11, a tappet 12, a push rod 13, a rocker arm 14 with a rocker-arm axle 15, a setting screw 16, a valve 17 with a spring plate 18, a valve guide 19 and a valve spring 20. These parts are to some extent very susceptible to wear. It is known that the wear-resistance at the working surface of the cam shaft 11 can be increased by providing on the tappet 12, for example by soldering, welding, shrinkage or the like, a core material 2 which has a greater hardness than the material of the tappet 12. Hard metals, hardened metals or ceramic materials are used, for example as the material of the core material.

According to the method in accordance with the invention a core material 2 that cannot be reshaped is connected to the work piece, here, for example, the tappet 12, in a form-fitting manner by means of cold-extrusion or hot-extrusion.

A plan view (FIG. 2a) of and a section through (FIG. 2b) a core material 2, for example as an insert in a tappet, are shown in FIGS. 2a, 2b. The core material 2 here is formed as a disc and has a knurling 3 at its circumferential edge for the purpose of securing against torsion. The exterior 21 of the core material 2 tapers towards the outside of the work piece. The core material 2 in this case consists of a sintered ceramic material, that is, of silicon nitride $Si_3N_4$.

FIG. 3 shows, as a further example, a setting screw 16 of a valve drive of an internal combustion engine (cf. also FIG. 1). A work piece 1 is secured by means of extrusion to the end of the setting screw 16 that faces the valve, with this work piece 1 being connected to a ceramic material 23 in a form-fitting manner by means of extrusion.

A work piece for carrying out the method in accordance with the invention is diagrammatically shown in each of the following FIGS. 4 to 10. FIGS. 4a, 5a, 6a, 7a, 8a, 9a, 10a each show the work piece in the tool before the connection has been established and FIGS. 4b, 5b, 6b, 7b, 8b, 9b, 10b show it after the connection has been established.

FIGS. 4a, b diagrammatically show forward cup extrusion. In this case, a bore 5, in which a punch 6 and an ejector 7 are arranged in a displaceable manner, is introduced into a sleeve liner 4. The ejector 7 is used as an abutment for the punch 6 during the pressing process and is used to press out the work piece 1 after the connection has been established. The work piece 1 and the core material 2 are located between the ejector 7 and the punch 6. The core material 2 is a sintered ceramic material and the work piece 1 is steel or non-ferrous metal. The core material 2 rests upon the ejector 7 and has an elevation 23 facing the work piece 1. During the pressing process the punch 6 presses the work piece 1 onto the core material 2 in such a way that the material of the work piece 1 begins to flow and flows around the raised part 23 of the core material 2. The result, namely the form-fitting connection, is shown in FIG. 4b. After the process of cold-extrusion, the punch 6 is moved back and the work piece 1 is pressed out by means of the ejector 7. Hot-extrusion is effected in a similar manner, only here heat is also supplied, in addition.

FIGS. 5a, b diagrammatically show backward cup extrusion. This is very similar to the ford cup extrusion in accordance with FIGS. 4a, b, only here the core material 2 is pressed into the work piece 1.

FIGS. 6a, b diagrammatically show forward tube extrusion. As a special feature here the bore 5 has a constriction 8 in the sleeve liner 4. This constriction 8 is used as an abutment for the work piece 1 during the cold-extrusion. The work piece 1 additionally has a recess 24 and the core material 2 has a peg 25 adapted thereto, with the peg 25 being inserted into the recess 24 before the connection is established. During the connection, the work piece is pressed beyond the constriction 8 in the direction of the ejector 7. The ejector 7 is pushed back and after the connection is merely used to press out the work piece 1. After the connection has been established, a hollow space 26 will have developed in the recess 24 that was present before the connection.

FIGS. 7a, b diagrammatically show backward tube extrusion. The core material 2 rests upon the ejector 7 and in turn has a peg 25 that faces the material and which is inserted into a recess 24 of the work piece 1. However, as a special feature here the punch 6 is formed as a hollow punch. Only the outer region of the work piece 1 is therefore subjected to cold-extrusion. After the connection has been established, as already shown in FIG. 6b, a hollow space 26 is created in the work piece 1.

FIGS. 8a, b show forward solid extrusion or reduction. Here again there is in the bore 5 a constriction 8 that is formed as an incline on which the work piece 1 sits. After the connection has been established, the ejector 7 is only used to press out the work piece 1. Provided in the work piece 1 there is a recess 24 into which the core material 2 is inserted. The punch 6 in this embodiment has a clearance 9 from the bore 5 in the sleeve liner 4. The diameter of the punch 6 which rests upon the core material 2 corresponds exactly to the diameter of the core material 2. During the cold-extrusion, the diameter of the work piece 1 is reduced as a result of the constriction 8, whereby a firm connection is achieved.

FIGS. 9a, b show backward solid extrusion. Here the work piece 1, which before the connection has been established is in the form of a disc, is arranged on the ejector 7. The core material 2 is set annularly upon the work piece 1 at the outer region thereof. During the cold-extrusion, the core material 2 is pressed down by the punch 6, whereby the work-piece material flows into the hollow space 10.

FIGS. 10a, b show lateral extrusion or compression. Here the work piece 1 is in the form of a T-shape in cross section before the cold-extrusion and the core material 2 is set thereon annularly. During the cold-extrusion, the work-piece material flows around the core material 2 so that the core material is surrounded on three sides by the work piece 1. Here accordingly the peg which develops as a result of the backward extrusion is reshaped as a result of a subsequent compression or lateral-extrusion operation so that comparatively firm seating of the connection in the axial direction results.

Combinations of the individual methods are possible in succession or in one single operation. For example, all the time here there has been talk of the advantageous cold-extrusion method, although the hot-extrusion method can also be used in an advantageous manner.

What is claimed is:

1. A method for increasing the wear-resistance of a work piece, comprising connecting the work piece to a core material that cannot be reshaped and which is of a greater hardness than the work-piece material in a form-fitting manner by means of cold-extrusion or hot-extrusion of the work-piece material, wherein the core material comprises ceramic material and has additional shaped elements provided on a peripheral surface of the core material for securing the core material against torsion in the work piece after connecting the work piece to the core material.

2. Method according to claim 1, characterized in that the additional shaped elements comprise a knurling that is provided on an outer peripheral surface of the core material.

3. Method according to claim 1, characterized in that the ceramic material is selected from the group consisting of oxide ceramics, silicon nitrides, silicon carbides, dispersion ceramic materials, ceramic silicate materials and mixtures of titanium carbide and aluminum oxide.

4. Method according to claim 3, characterized in that the ceramic material contains at least one admixed material selected from the group consisting of magnesium oxide, calcium oxide, yttrium oxide and grain growth inhibitors.

5. Method according to claim 3, characterized in that the ceramic material is an oxide ceramic selected from the group consisting of aluminum oxide, zirconium oxide, magnesium oxide and mixtures of aluminum oxide and zirconium oxide.

6. Method according to claim 3, characterized in that the ceramic material is a silicon nitride selected from the group consisting of sintered silicon nitride, hot pressed silicon nitride, and gas pressure sintered silicon nitride.

7. Method according to claim 3, characterized in that the ceramic material is a silicon carbide selected from the group consisting of densely sintered silicon carbide and silicon-infiltrated silicon carbide.

* * * * *